United States Patent
Yamazaki et al.

(10) Patent No.: US 7,092,413 B2
(45) Date of Patent: Aug. 15, 2006

(54) LASER MACHINING APPARATUS

(75) Inventors: Etsuo Yamazaki, Yamanashi (JP); Kazuhiro Suzuki, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 321 days.

(21) Appl. No.: 10/838,335

(22) Filed: May 5, 2004

(65) Prior Publication Data
US 2004/0222201 A1    Nov. 11, 2004

(30) Foreign Application Priority Data
May 9, 2003    (JP)    ............................. 2003-131973

(51) Int. Cl.
*H01S 3/10*    (2006.01)
(52) U.S. Cl. .............................. 372/9; 372/33; 372/34; 372/29.01
(58) Field of Classification Search .................... 372/9, 372/33–34
See application file for complete search history.

(56) References Cited

U.S. PATENT DOCUMENTS

| | | | | |
|---|---|---|---|---|
| 4,937,422 A | * | 6/1990 | Nagamine et al. | 219/121.61 |
| 5,091,914 A | | 2/1992 | Maeda et al. | |
| 5,625,616 A | * | 4/1997 | Koike et al. | 369/53.26 |
| 2002/0114363 A1 | | 8/2002 | Everett | |

FOREIGN PATENT DOCUMENTS

| | | |
|---|---|---|
| EP | 0 419 671 A1 | 4/1991 |
| EP | 1 233 488 A1 | 8/2002 |
| JP | 01018285 | 1/1989 |
| JP | 03-62515 B | 9/1991 |
| JP | 06061555 | 3/1994 |
| JP | 2804027 B | 7/1998 |

OTHER PUBLICATIONS

EP Search Report for corresponding EP Application No. 04 25 2591 mailed Sep. 10, 2004.

* cited by examiner

*Primary Examiner*—Armando Rodriguez
*Assistant Examiner*—Dung Nguyen
(74) *Attorney, Agent, or Firm*—Staas & Halsey LLP

(57) ABSTRACT

A laser machining apparatus in which laser output can be easily corrected in view of secular change of components of the laser machining apparatus and influence of temperature. Output values of a laser oscillator operated according to a reference laser output command value Psc are stored as reference output values $P(\theta)$ at different temperatures $\theta$ in a table TB1. When the laser oscillator is started up, a measured output value Pr of the laser oscillator supplied with the reference command value Psc is obtained, and a new correction coefficient k is obtained to replace an old one. From a reference output value $P(\theta)$ at a temperature at that time and the actual output measured value Pr, a correction value $\Delta P$ is obtained and stored. Each time temperature $\theta$ is measured, a reference output value $(P\theta)$ at a measured temperature $\theta$ is obtained from the table TB1, an estimated output value Pa is obtained by subtracting the correction value $\Delta P$ from the reference output value $(P\theta)$, and a new correction coefficient k is obtained to replace an old one. In other words, an output value at a different temperature is estimated on the basis of the correction value $\Delta P$ obtained when the laser oscillator is started up, and a new correction coefficient k is obtained to replace an old one. When the temperature reaches a predetermined temperature, a new final correction coefficient k is obtained on the basis of the reference command value and a measured output value to replace an old one.

13 Claims, 5 Drawing Sheets

LASER MACHINING APPARATUS

BACKGROUND OF THE INVENTION

1. Field of the Invention

The present invention relates to a laser machining apparatus and particularly to correction of a laser output of a laser oscillator.

2. Description of Related Art

In machining with a laser machining apparatus, in order to keep machining performance constant, it is necessary to control the output value, or output power of a laser oscillator accurately. In the laser machining apparatus, the angle of a mirror is changed to change the path of a laser beam. Due to this change of the mirror angle, and other reasons such as optical components such as mirrors becoming soiled and high-frequency power source loss, the output power of the laser oscillator changes with age.

As a way to compensate for this secular change, there is known an invention in which relation between command values supplied to a laser oscillator and actual output values is obtained in advance and stored as a table, and in which a command value for obtaining a required laser output value is obtained on the basis of the table and supplied (see JP 3-62515B).

In the invention disclosed in this publication, it is necessary to change the table every predetermined period in view of the secular change, and remaking the table involves difficulties. Thus, another easy laser output correction method has been developed. In this method, when a laser oscillator is started up, the laser output is measured with an output power measuring device after the laser output stabilizes. Then, a correction coefficient is obtained from the measured laser output value and a command value. From this time onwards, a command value multiplied by this correction coefficient is supplied as a corrected command value to perform machining (see JP 2804027B).

Apart from the secular change of components of the laser machining apparatus, the temperature at which the laser oscillator operates changes the output power of the laser oscillator. Hence, also this temperature at which the laser oscillator operates needs to be taken into consideration.

In the above-mentioned invention disclosed in JP 2804027B, a laser output correction value can be obtained easily by measuring the laser output when the laser oscillator is started up. To the laser oscillator, coolant is supplied under water temperature control so that the laser oscillator can reach a steady state quickly. However, when the laser oscillator is being started up, also the water temperature control is being started up, so that the coolant is being supplied under imperfect water temperature control. It takes more time until the water temperature of the coolant comes to be kept at a desired value than until the laser output stabilizes. Hence, the laser output is measured while the water temperature is still changing, and the correction coefficient is obtained on the basis of the laser output thus measured.

Even when the laser output of the started-up laser oscillator is measured after the laser output stabilizes and the correction coefficient is obtained on the basis of the obtained laser output value, it only means that the correction coefficient is obtained in view of the secular change of the output power. It does not mean that the correction coefficient is obtained in view of the influence of temperature. Hence there is a problem that when the laser oscillator reaches a steady state where the water temperature is at a predetermined temperature, the laser output value changes, so that an accurate laser output value cannot be obtained.

SUMMARY OF THE INVENTION

The present invention provides a laser machining apparatus capable of easily correcting a laser output not only taking account of secular change of components of the laser machining apparatus but also taking account of influence of temperature.

A laser machining apparatus of the present invention performs laser machining by supplying a laser oscillator with a corrected laser output command obtained by multiplying an output command value by a correction coefficient. According to one aspect of the invention, the laser machining apparatus comprises: output power measuring means for measuring a laser output of the laser oscillator to obtain an actual output measured value; temperature measuring means for measuring temperature of an object of temperature control in the laser oscillator; storage means storing relational information on relation between a reference output command value and an actual output value of the laser oscillator measured at different temperatures when supplying the laser oscillator with the reference output command value; first updating means for updating the correction coefficient based on an actual output measured value obtained by the output power measuring means when the laser oscillator is started up with the reference output command value; correction value calculating means for calculating a correction value based on temperature measured when the laser oscillator is started up and the relational information stored in the storage means; and second updating means for updating the correction coefficient based on the relational information stored in the storage means, temperature measured by the temperature measuring means and the calculated correction value each time when the temperature is measured by the temperature measuring means after the laser oscillator is started up until the measured temperature reaches a predetermined value. With the above arrangement, an output command value is corrected in a simple manner so that stable laser output is obtained even in a period of transition from start up to steady state of the laser oscillator.

The relational information stored in the storage means may comprise reference output values obtained by measuring laser outputs of the laser oscillator supplied with the reference output command value at the different temperatures, the correction value calculating means may comprise means for calculating the correction value based on a reference output value for the temperature measured when the laser oscillator is started up with the reference output command value, and the actual output value measured when the laser oscillator is started up; and the second updating means may comprise means for calculating an estimated output value based on a reference output value for the temperature measured by the temperature measuring means after the laser oscillator is started up and the calculated correction value, and means for updating the correction coefficient based on the reference output command value and the estimated output value.

In this case, the correction value may be obtained as a difference between the reference output value for the temperature measured when the laser oscillator is started up and the actual output measured value obtained when the laser oscillator is started up. The estimated output value may be obtained by adding or subtracting the correction value to or from a reference output value for measured temperature each time when the temperature measuring means measures the temperature after the laser oscillator is started up.

Alternatively, the relational information stored in the storage means may comprise reference correction coefficients obtained based on actual output measured values of the laser oscillator supplied with the reference output command value at the different temperatures and the reference output command value, the correction value calculating means may comprise means for calculating the correction value based on a reference correction coefficient for the temperature measured when the laser oscillator is started up with the reference output command and the correction coefficient updated by the first updating means; and the second updating means may comprise means for calculating an estimated correction coefficient based on a reference correction coefficient for temperature measured by the temperature measuring means after the laser oscillator is started up and the calculated correction value, and means for updating the correction coefficient to the estimated correction coefficient.

In this case, the correction value may be obtained by dividing the correction coefficient updated by the first updating means by the reference output correction coefficient for the temperature measured when the laser oscillator is started up. The estimated output value may be obtained by multiplying a reference correction coefficient for measured temperature by the correction value each time when the temperature is measured by the temperature measuring means after the laser oscillator is started up.

Further, the laser machining apparatus may comprise third updating means for updating the correction coefficient based on the reference output command value and an actual output measured value of the laser oscillator supplied with the reference output command value, when temperature measured by the temperature measuring means reaches the predetermined value.

According to another aspect of the invention, a laser machining apparatus comprises: output power measuring means for measuring a laser output of the laser oscillator to obtain an actual output measured value; temperature measuring means for measuring temperature of an object of temperature control in the laser oscillator; first updating means for updating the correction coefficient based on an actual output measured value obtained by the output power measuring means when the laser oscillator is started up with the reference output command value; second updating means for updating the correction coefficient based on the reference laser output command value and an actual output measured value of the laser oscillator obtained by the output power measuring means by supplying the laser oscillator with the reference output command value, when the temperature measured by the temperature measuring means has reached a predetermined value.

The temperature of the object of temperature control may be temperature of coolant of the laser oscillator, or temperature of a resonator of the laser oscillator.

DETAILED DESCRIPTION

Figure 1:
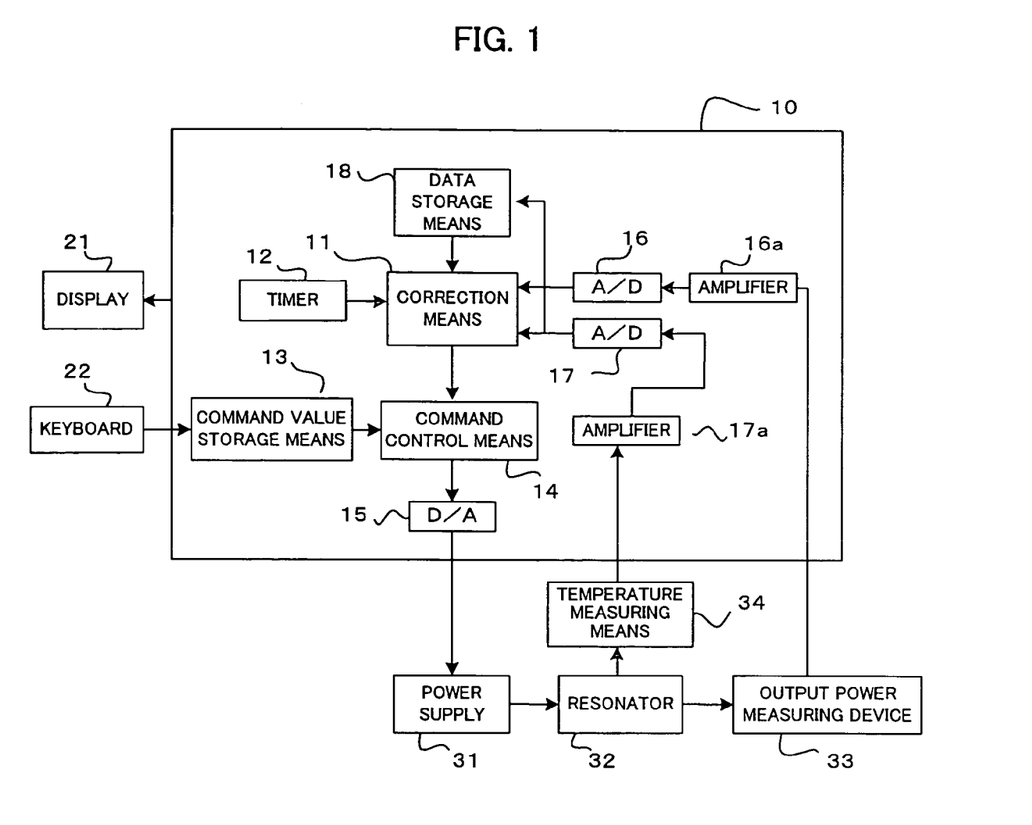
FIG. 1 is a block diagram showing relevant parts common to laser machining apparatuses according to different embodiments of the invention.

FIG. 1 is block diagram showing relevant parts common to laser machining apparatuses according to different embodiments of the invention.

Reference numeral 10 denotes a computer numerical control (CNC) for controlling a laser machining apparatus. The CNC 10 comprises a correction means 11, a timer 12, a command value storage means 13, a command control means 14, a D/A converter (digital-to-analog converter) 15, A/D converters (analog-to-digital converters) 16 and 17, and amplifiers 16a and 17a. The correction means 11 calculates a correction coefficient on the basis of a reference laser output command value and a value such as an actual output measured value obtained by measuring the actual laser output of a laser oscillator operated according to the reference laser output command value. The correction means 11 has an internal memory in which the calculated correction coefficient is stored. The timer 12 measures required time and notifies the correction means 11.

In the command value storage means 13 is stored a laser output command value for laser machining entered on a keyboard 22 or the like. The command control means 14 reads the correction coefficient stored in the correction means 11, multiplies the laser output command value stored in the command value storage means 13 by the correction coefficient, and feeds the resulting value to the D/A converter 15. The D/A converter 15 converts this value into an analog signal to drive-control a power source 31 of the laser oscillator.

A measurement signal supplied from an output power measuring device 33 for measuring the laser output of a resonator 32 of the laser oscillator is amplified by the amplifier 16a, converted into a digital signal by the A/D converter 16 and supplied to the correction means 11. As mentioned above, this measured actual laser output value is used in calculating a correction coefficient.

A temperature measuring means 34 detects temperature of an object of temperature control, such as water temperature of coolant supplied to the laser oscillator or temperature of a predetermined part of the resonator 32 that affects the output of the laser oscillator. A signal indicative of a measured temperature obtained by the temperature measuring means 34 is amplified by the amplifier 17a, converted into a digital signal by the A/D converter 17 and supplied to the correction means 11. This temperature data is also used in calculating a correction coefficient.

Figure 2A:
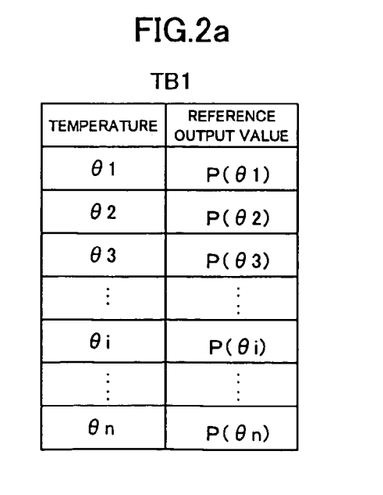
FIGS. 2a and 2b show tables according to first and second embodiments of the invention each storing information about relation between temperature and reference output value.

In a data storage means 18, measured output values at different temperatures, which are obtained by measuring the output of the laser oscillator operated according to a known reference laser output command value by means of the output power measuring device 33, are stored as reference output values, or alternatively, correction coefficients at different temperatures, which are obtained from the above-mentioned reference laser output command value and reference output values, are stored as reference correction coefficients. FIG. 2a shows a table TB1 storing reference output values at different temperatures. Specifically, laser output values obtained by measuring the output of the laser oscillator operated according to the reference laser output command value by means of the output power measuring device 33, at different temperatures θi (i=1 to n) detected by the temperature measuring means 34, are stored as reference output values P(θi) (i=1 to n) at those different temperatures.

Figure 2B:
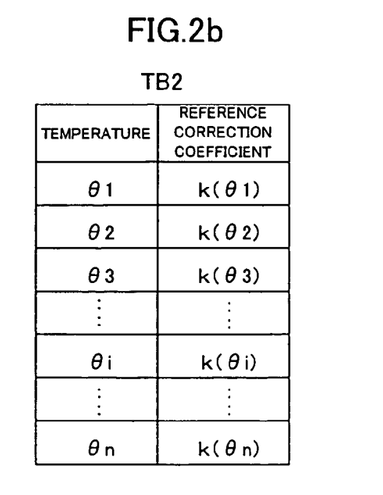

FIG. 2b shows a table TB2 storing reference correction coefficients at different temperatures. Specifically, the values obtained by dividing the reference laser output command value by the individual actual output measured values (=reference output values P(θi)) are stored in the table TB2 as reference correction coefficients k(θi) (i=1 to n) at the different temperatures θi (i=1 to n).

As described later, the reference output values P(θi) stored in the table TB1 or the reference correction coefficients k(θi) stored in the table TB2 are used in correcting a laser output command value.

Reference numeral 21 denotes a display such as a CRT display or a liquid crystal display, which displays a mechanical position and a speed of the laser machining apparatus, a laser output state, machining conditions and others. The keyboard 22 is used to enter various kinds of data, parameters and others, in addition to above-mentioned laser output command values.

Figure 3:
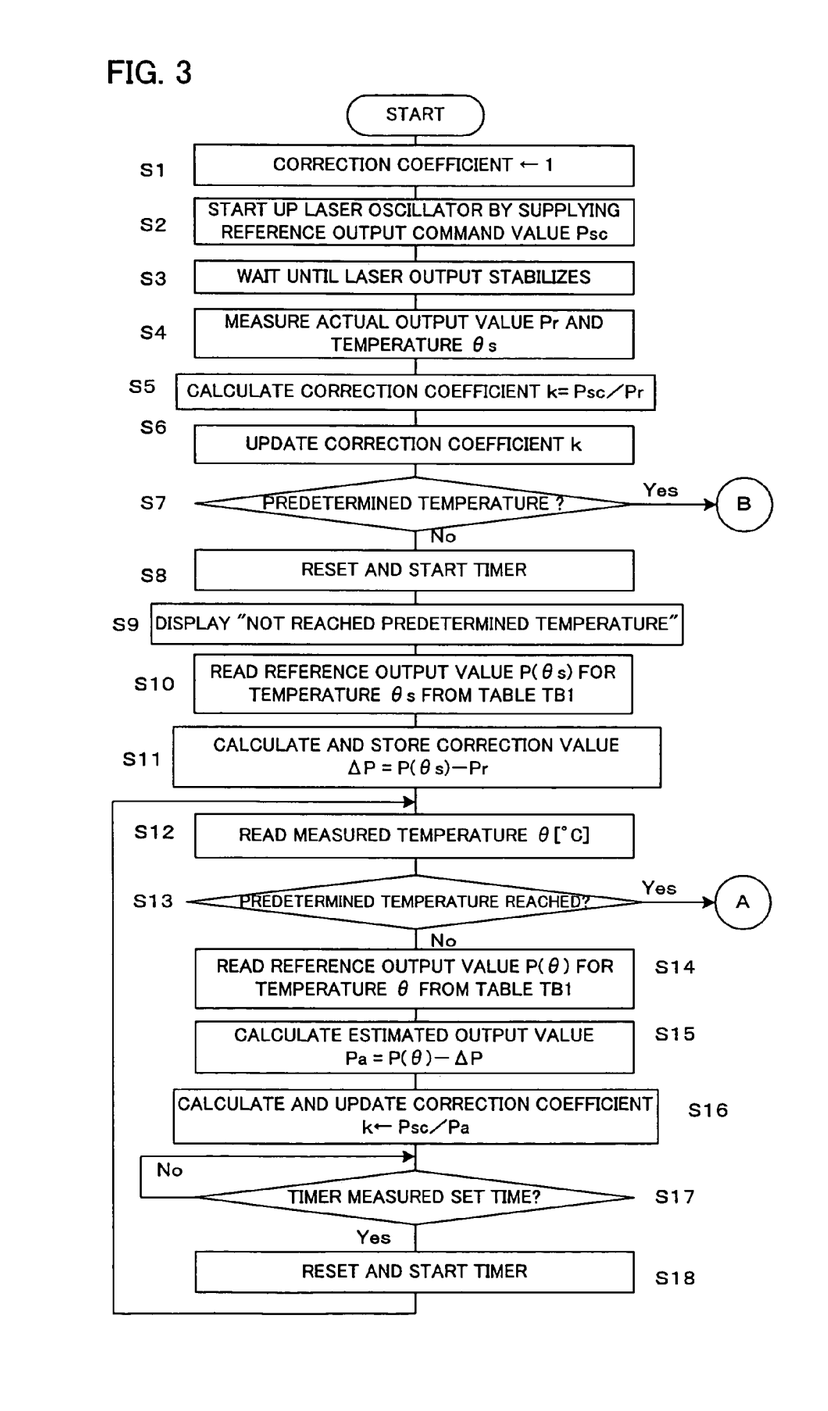
FIG. 3 is a flow chart showing a process for obtaining a correction coefficient in the laser machining apparatus according to the first embodiment of the invention.
Figure 4:
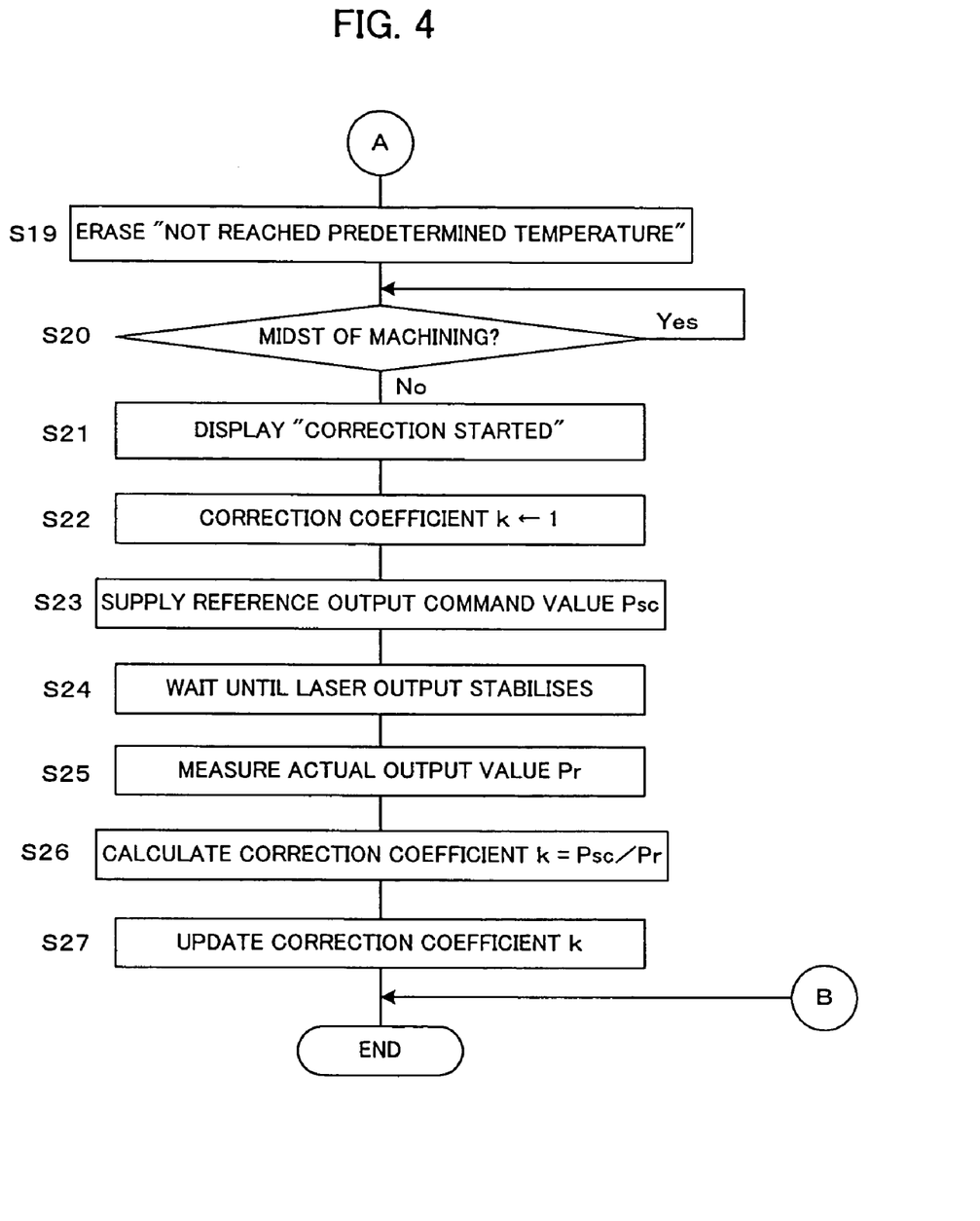
FIG. 4 is a flow chart that follows the flow chart of FIG. 3.

FIGS. 3 and 4 are flow charts showing a process for obtaining a correction coefficient performed by a processor (mainly by the correction means 11) of the CNC 10 of the laser machining apparatus according to a first embodiment of the invention. In this embodiment, a table TB1 storing reference output values P(θi) at different temperatures θi obtained when a reference laser output command value is supplied as shown in FIG. 2a is stored in the data storage means 18.

When the power source of the laser machining apparatus is turned on and the laser oscillator is started up, the processor of the CNC starts the process shown in FIGS. 3 and 4.

First a correction coefficient k is set to "1" (Step S1). Then, a reference laser output command value Psc entered on the keyboard and stored in the command value storage means 13 is multiplied by this correction coefficient k, and the resulting value is supplied to the power source 31 of the laser oscillator (Step S2). Here, since the correction coefficient k is 1, the command value multiplied by the correction coefficient k is equal to the reference laser output command value Psc. Then, the processor waits until the laser output stabilizes (Step S3). (Normally, the waiting time is 2 to 3 minutes.) After the time that allows the laser output to stabilize has passed, a measured output value (actual output measured value) Pr of a laser beam emitted from the resonator 32 of the laser oscillator, which is obtained by the output power measuring device 33, is read, and also temperature θs of an object of temperature control, such as temperature of coolant or temperature of a predetermined part of the resonator that affects the laser output, which is measured by the temperature measuring means 34, is read (Step S4). It is to be noted that the measured temperature θ first obtained after the reference laser output command value is supplied to the laser oscillator will be hereinafter denoted by a reference symbol θ with a letter s, namely θs, in order to distinguish this temperature from temperatures obtained at other times.

Then, a correction coefficient k is obtained by dividing the reference laser output command value Psc by the actual output measured value Pr:

$$k = Psc/Pr.$$

The correction coefficient k obtained this way is stored. From this time onwards, a corrected command value obtained by multiplying the command value by the correction coefficient k is supplied to the power source 31 of the laser oscillator (Step S6).

Suppose that the reference laser output command value Psc is 1000 W, and that the measured actual laser beam output value Pr is 800 W. This means that the output decreases to 80% of the command value. In this case, the correction coefficient k is 1000/800=1.25. Hence, when a command value is equal to the reference command value, namely 1000 W, the command value multiplied by the correction coefficient is 1000×1.25 W. Since the output value decreases to 80% of this corrected command value, the output value is 1000×1.25×0.8=1000 W. Thus, it is expected that the output value equal to the original command value can be obtained.

Next, the measured temperature θ obtained by the temperature measuring means 34 is read, and whether the measured temperature θ is a predetermined target temperature in temperature control or not is determined (Step S7). If the measured temperature θ has reached the predetermined target temperature in temperature control, it means that the correction coefficient has been obtained on the basis of the actual output measured value Pr obtained at the temperature that has reached the predetermined target temperature. Hence, the correction coefficient determination process ends.

If the measured temperature θ has not reached the predetermined target temperature, the timer is reset and started (Step S8), and an indication "not reached predetermined temperature" is displayed on the display 21 (Step S9). From the TB1 stored in the data storage means 18, a reference output value P(θs) for the measured temperature θs read at Step S4 is read. For example, if the measured temperature θs is temperature θi stored in the table TB1, a reference output value P(θi) is read (Step S10).

Then, by subtracting the measured actual laser beam output value Pr obtained at Step S4 from the reference output value P(θs) at the current temperature θs read this way, a correction value ΔP is obtained. This means that though the output value of the laser oscillator at the current temperature is expected to be the reference output value P(θs) stored as a reference, it is actually only the actual output measured value Pr, and hence differs from the reference stored in the table TB1 by ΔP. Thus, this difference ΔP is used as an output correction value ΔP on the assumption that at any temperature, the output value differs from the reference output value stored as P(θ1) to P(θn) in the table TB1 by the difference ΔP (Step S11).

Next, a measured temperature θ obtained by the temperature measuring means 34 is read (Step S12), and whether the measured temperature θ has reached the predetermined target temperature or not is determined (Step S13). If not, a reference output value P(θ) for the temperature θ is read from the table TB1 (Step S14). Then, by subtracting the output correction value ΔP from the reference value P(θ), an estimated output value Pa is obtained (Step S15):

$$Pa = P(\theta) - \Delta P.$$

This is based on the assumption that since the difference between the reference output value P(θs) and the actual output measured value Pr at the measured temperature $\theta s$ was $\Delta P$ (=output correction value), the actual output value should differ from the reference output value by the output correction value $\Delta P$ also at the measured temperature $\theta$. Thus, by subtracting the output correction value $\Delta P$ from the reference output value $P(\theta)$, the estimated output value Pa is obtained in place of an actual output measured value.

Next, the correction coefficient k is updated to a value obtained by dividing the reference laser output command value Psc by the estimated output value Pa, and the updated correction coefficient k is stored (Step S16). From this time onwards, a corrected command value obtained by multiplying the command value by the updated correction coefficient k is supplied.

Then, the processor waits until the timer measures set time (Step S17). When the timer measures the set time, the timer is reset and started again (Step S18), and Step 12 is performed again. From this time onwards, the process consisting of Steps S12 to S18 is repeated to update the correction coefficient k until the temperature $\theta$ measured by the temperature measuring means 34 reaches the predetermined temperature (target temperature in temperature control).

Suppose that the measured temperature $\theta s$ and the actual output measured value Pr read at Step S4 are 10° C. and 800 W, respectively, and that the reference output value P(10) corresponding to this measured temperature $\theta s$ read from the table TB1 is 850 W. In this case, the output correction value $\Delta P$ is 850−800=50 W.

Further, suppose that the measured temperature $\theta$ read at Step 12 is 15° C., and that the reference output value P(15) corresponding to this measured temperature stored in the table TB1 is 900 W. In this case, the estimated output value Pa calculated at Step S15 is P(15)−$\Delta P$=900−50=850 W, and the correction coefficient k is Psc/Pa=1000/850=1.176.

When the measured temperature $\theta$ reaches the predetermined target temperature, Step S19 is performed after Step S13, namely the indication "not reached predetermined temperature" displayed on the display 21 is erased. Then, whether machining is being performed or not is determined, and if machining is being performed, the processor waits until the machining is completed (Step S20). Then, an indication "correction started" is displayed on the display 21 (Step S21), the correction coefficient k is set to be "1" (Step S22), and the reference laser output command value Psc is supplied. The processor waits until the laser output stabilizes, and then reads an actual output measured value Pr obtained by the output power measuring device 33 (Steps S23 to 25). Then, the correction coefficient k is calculated by dividing the reference laser output command value Psc by the actual output measured value Pr (Step S26), and the correction coefficient k is updated to the calculated value and stored (Step S27), to terminate the process for obtaining the correction coefficient.

As described above, in the first embodiment, when the laser oscillator is started up, first the laser oscillator is operated according to the reference laser output command value Psc, and an actual output measured value Pr and a measured temperature $\theta s$ at that time are obtained. Then a difference $\Delta P$ between a reference output value $P(\theta s)$ at this measured temperature $\theta s$ stored in the table TB1 and the actual output measured value Pr is stored as an output correction value. Then, a measured temperature $\theta$ is newly obtained, an estimated output value Pa is obtained by subtracting the output correction value $\Delta P$ from a reference output value $P(\theta)$ corresponding to this measured temperature $\theta$ stored in the table TB1, and a new correction coefficient k is obtained on the basis of this estimated output value to replace an old one. Until the temperature $\theta$ measured by the temperature measuring means 34 reaches the target temperature in temperature control, a new correction coefficient k is obtained on the basis of an estimated output value to replace an old one, in this manner, repeatedly. When the temperature $\theta$ measured by the temperature measuring means 34 reaches the target temperature in temperature control, an actual output measured value Pr of the laser oscillator supplied with the reference laser output command value Psc is obtained, and a correction coefficient k is obtained on the basis of this actual output measured value Pr, as a final correction coefficient.

Next, the second embodiment of the invention will be described. In the above-described first embodiment, actual output measured values Pr at different temperatures $\theta$ on the basis of the reference laser output command value are obtained in advance and stored as reference output values $P(\theta)$ in the table TB1 as shown in FIG. 2a in the data storage means 18, and the correction coefficient k is updated on the basis of the table TB1. Meanwhile, in the second embodiment, actual output measured values Pr at different temperatures $\theta$ on the basis of the reference laser output command value Psc are obtained, and then on the basis of these actual output measured values Pr and the reference laser output command value Psc, correction coefficients k at the different temperatures $\theta$ are obtained and stored as reference correction coefficients $k(\theta i)$ (i=1 to n) in the table TB2 as shown in FIG. 2b, and the correction coefficient k is updated on the basis of the table TB2.

Figure 5:
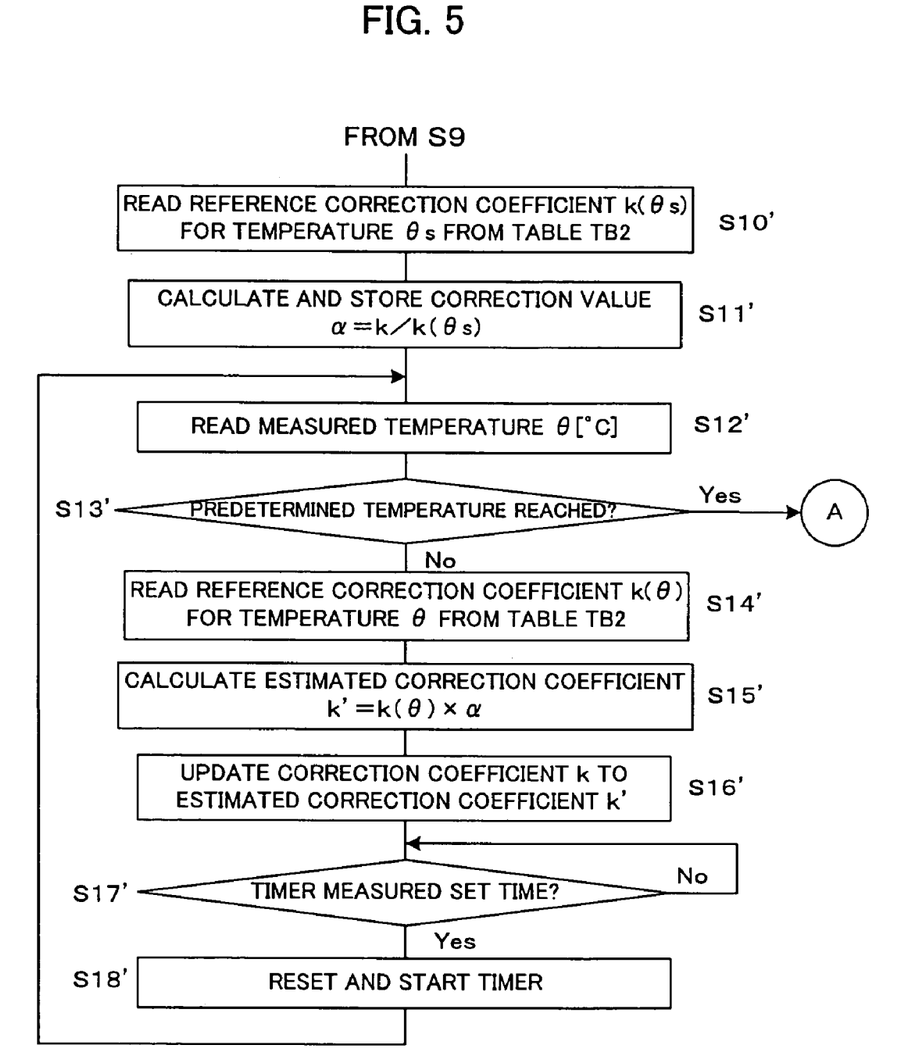
FIG. 5 is a flow chart showing a main part of a process for obtaining a correction coefficient in the laser machining apparatus according to the second embodiment of the invention.

In the second embodiment, Steps S1 to S9 and Steps S19 to S27 are the same as those in the first embodiment, while Steps S10 to S18 in the first embodiment are replaced with Steps S10' to S18' shown in FIG. 5.

When the laser oscillator is started up, Steps S1 to S9 are performed. Then, a reference correction coefficient $k(\theta s)$ for the measured temperature $\theta s$ read at Step S4 is read from the table TB2 (Step S10'). Then, a correction value $\alpha$ is obtained by dividing a correction coefficient k obtained at Step S5 by the read reference correction coefficient $k(\theta s)$ (Step S11'):

$\alpha = k/k(\theta s)$.

Next, a measured temperature $\theta$ obtained by the temperature measuring means 34 is read (Step S12'), and whether the measured temperature $\theta$ has reached a predetermined target temperature or not is determined (Step S13'). If not, a reference correction coefficient $k(\theta)$ for the read temperature $\theta$ is read from the table TB2 (Step S14'). Then, by multiplying the reference correction coefficient $k(\theta)$ by the correction value $\alpha$, an estimated correction coefficient k is obtained (Step S15'). The correction coefficient k is updated to the estimated correction coefficient k and stored in the memory (Step S16'). Then, the processor waits until the timer measures set time. When the timer measures the set time, the timer is reset and started again (Steps S17' and S18'), and Step S12' is performed again. From this time onwards, the process consisting of Steps S12' to S18' is repeated to update the correction coefficient k until the measured temperature reaches the predetermined temperature. When the measured temperature reaches the predetermined temperature, Step S19 is performed after Step S13', and the Steps subsequent to Step S19 described with respect to the first embodiment is performed.

In this second embodiment, a correction value $\alpha$ for use in correcting reference correction coefficients $k(\theta i)$ (i=1 to n) is obtained on the basis of an actual output measured value Pr of the laser oscillator supplied with the reference laser output command value and a measured temperature θ obtained when the laser oscillator is started up, and data stored in the table TB2. From this time until the measured temperature θ reaches the target predetermined temperature, an estimated correction coefficient k' is obtained by multiplying a corresponding one of the reference correction coefficients k(θi) (i=1 to n) stored in the table TB2 by the correction value α, and stored as a new correction coefficient k to replace an old one. When the measured temperature θ reaches the target predetermined temperature, an actual output measured value Pr of the laser oscillator supplied with the reference laser output command value Psc is newly obtained, and on the basis of this actual output measured value Pr, a correction coefficient k is obtained as a final correction coefficient.

Figure 6:
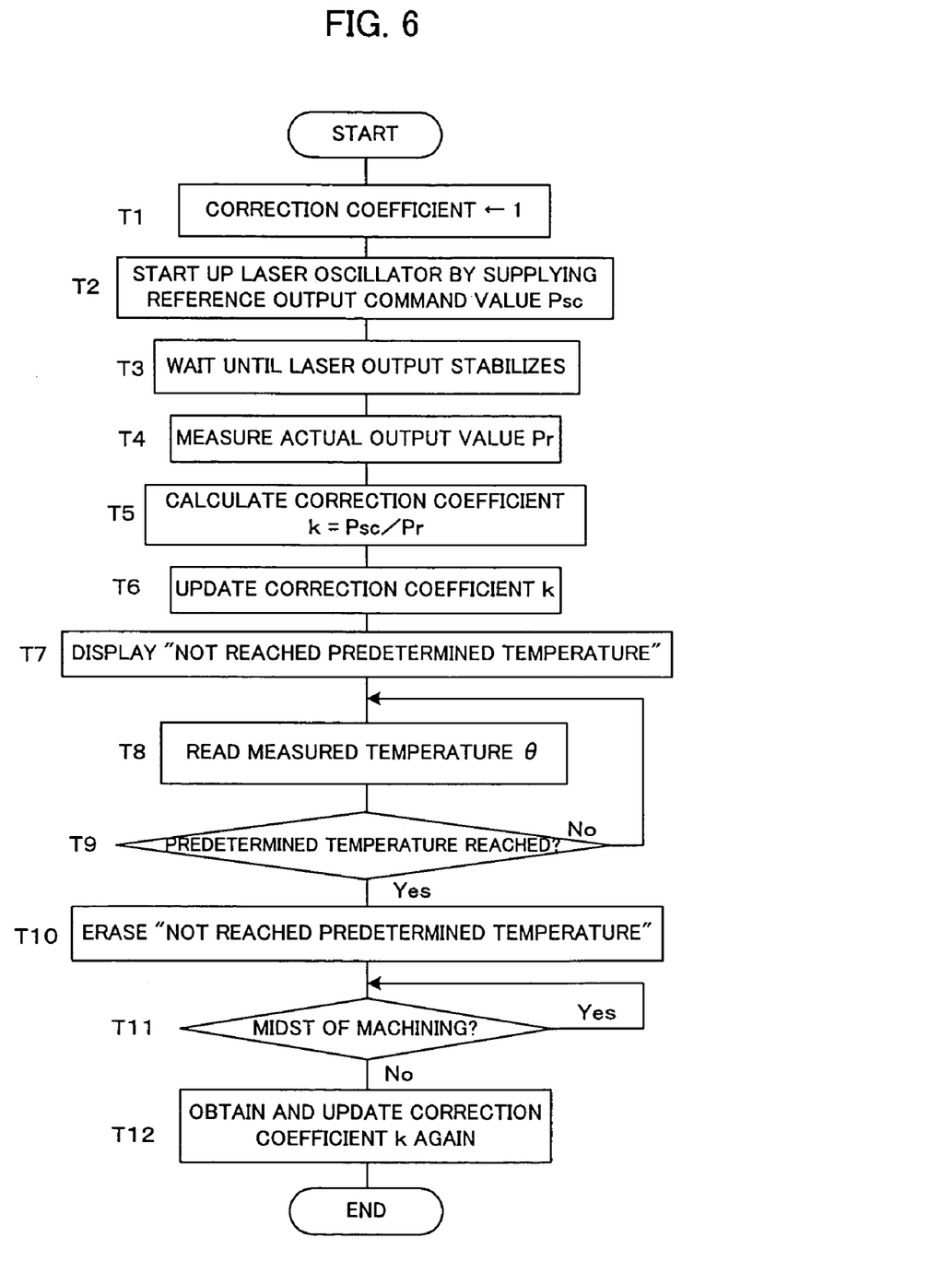
FIG. 6 is a flow chart showing a process for obtaining a correction coefficient in the laser machining apparatus according to a third embodiment of the invention.

FIG. 6 is a flow chart showing a process for updating a correction coefficient according to a third embodiment of the invention.

When the power source of the laser machining apparatus is turned on and the laser oscillator is started up, the processor of the CNC starts the process of FIG. 6. First, a correction coefficient k is set to "1" (Step T1). Then a reference laser output command value Psc entered on the keyboard and stored in the command value storage means 13 is supplied (Step T2). Specifically, the reference laser output command value Psc multiplied by the correction coefficient k is supplied to the power source 31 of the laser oscillator. Since the correction coefficient k is initially "1", the command value multiplied by the correction coefficient k is equal to the reference laser output command value Psc. Then the processor waits for a few seconds until the laser output stabilizes (Step T3), and then a measured output value (actual output measured value) Pr of a laser beam emitted from the resonator 32 of the laser oscillator obtained by the output power measuring device 33 is read (Step T4). Then the correction coefficient k is calculated by dividing the reference laser output command value Psc by the actual output measured value Pr (Step T5). The correction coefficient k is updated to the calculated value and stored (Step T6). From this time onwards, a corrected laser output command value obtained multiplying the command value by the correction coefficient k is supplied to the power source 31 of the laser oscillator.

An indication "not reached predetermined temperature" is displayed on the display 21 (Step T7), and the processor waits until the temperature θ measured by the temperature measurement device 34 reaches a predetermined target value in temperature control (Steps T8 and T9). When the temperature θ reaches the predetermined target value, the indication "not reached predetermined temperature" is erased (Step T10), and whether machining is being performed or not is determined. If machining is being performed, the processor waits until the machining ends (Step 11). Then the process for obtaining and updating the correction coefficient, which is identical to Steps T1 to T6, is performed (Step T12), and the process for updating the correction coefficient terminates.

In the third embodiment, a correction coefficient k obtained on the basis of an actual output measured value Pr of the laser oscillator supplied with the reference laser output command value obtained when the laser oscillator is started up is used until the temperature reaches the predetermined target value in temperature control. When the temperature reaches the predetermined target value, namely the laser oscillator reaches a steady state, a new correction coefficient k is obtained as a final correction coefficient to replace an old one. The third embodiment is suitable for the case where the temperature does not change to a large degree.

In the present invention, when the started-up laser oscillator has not reached a steady state, the laser oscillator is operated according a command value multiplied by a correction coefficient obtained when the laser oscillator is started up. Thus, secular change of components of the laser machining apparatus and influence of temperature are taken into consideration, so that accurate laser output can be obtained. When the laser oscillator reaches a steady state, a new correction coefficient is obtained as a final correction coefficient, so that more accurate laser output can be obtained.

What is claimed is:

1. A laser machining apparatus for performing laser machining by supplying a laser oscillator with a corrected laser output command obtained by multiplying an output command value by a correction coefficient, comprising:

output power measuring means for measuring a laser output of the laser oscillator to obtain an actual output measured value;

temperature measuring means for measuring temperature of an object of temperature control in the laser oscillator;

storage means storing relational information on relation between a reference output command value and an actual output value of the laser oscillator measured at different temperatures when supplying the laser oscillator with the reference output command value;

first updating means for updating the correction coefficient based on an actual output measured value obtained by said output power measuring means when the laser oscillator is started up with the reference output command value;

correction value calculating means for calculating a correction value based on temperature measured when the laser oscillator is started up and the relational information stored in said storage means; and second updating means for updating the correction coefficient based on the relational information stored in said storage means, temperature measured by said temperature measuring means and the calculated correction value each time when the temperature is measured by said temperature measuring means after the laser oscillator is started up until the measured temperature reaches a predetermined value.

2. A laser machining apparatus according to claim 1, wherein the relational information stored in said storage means comprises reference output values obtained by measuring laser outputs of the laser oscillator supplied with the reference output command value at the different temperatures;

said correction value calculating means comprises means for calculating the correction value based on a reference output value for the temperature measured when the laser oscillator is started up with the reference output command value, and the actual output value measured when the laser oscillator is started up; and said second updating means comprises means for calculating an estimated output value based on a reference output value for the temperature measured by said temperature measuring means after the laser oscillator is started up and the calculated correction value, and means for updating the correction coefficient based on the reference output command value and the estimated output value.

3. A laser machining apparatus according to claim 2, wherein the correction value is obtained as a difference between the reference output value for the temperature measured when the laser oscillator is started up and the actual output measured value obtained when the laser oscillator is started up.

4. A laser machining apparatus according to claim 3, wherein the estimated output value is obtained by adding or subtracting the correction value to or from a reference output value for measured temperature each time when said temperature measuring means measures the temperature after the laser oscillator is started up.

5. A laser machining apparatus according to claim 1, wherein the relational information stored in said storage means comprises reference correction coefficients obtained based on actual output measured values of the laser oscillator supplied with the reference output command value at the different temperatures and the reference output command value;
said correction value calculating means comprises means for calculating the correction value based on a reference correction coefficient for the temperature measured when the laser oscillator is started up with the reference output command and the correction coefficient updated by said first updating means; and
said second updating means comprises means for calculating an estimated correction coefficient based on a reference correction coefficient for temperature measured by the temperature measuring means after the laser oscillator is started up and the calculated correction value, and means for updating the correction coefficient to the estimated correction coefficient.

6. A laser machining apparatus according to claim 5, wherein the correction value is obtained by dividing the correction coefficient updated by said first updating means by the reference output correction coefficient for the temperature measured when the laser oscillator is started up.

7. A laser machining apparatus according to claim 6, wherein the estimated output value is obtained by multiplying a reference correction coefficient for measured temperature by the correction value each time when the temperature is measured by said temperature measuring means after the laser oscillator is started up.

8. A laser machining apparatus according to claim 1, further comprising third updating means for updating the correction coefficient based on the reference output command value and an actual output measured value of the laser oscillator supplied with the reference output command value, when temperature measured by said temperature measuring means reaches the predetermined value.

9. A laser machining apparatus according to claim 1, wherein the temperature of the object of temperature control is temperature of coolant of the laser oscillator.

10. A laser machining apparatus according to claim 1, wherein the temperature of the object of temperature control is temperature of a resonator of the laser oscillator.

11. A laser machining apparatus for performing laser machining by supplying a laser oscillator with a corrected laser output command obtained by multiplying a laser output command value by a correction coefficient, comprising:
output power measuring means for measuring a laser output of the laser oscillator to obtain an actual output measured value;
temperature measuring means for measuring temperature of an object of temperature control in the laser oscillator;
first updating means for updating the correction coefficient based on an actual output measured value obtained by said output power measuring means when the laser oscillator is started up with the reference output command value;
second updating means for updating the correction coefficient based on the reference laser output command value and an actual output measured value of the laser oscillator obtained by said output power measuring means by supplying the laser oscillator with the reference output command value, when the temperature measured by the temperature measuring means has reached a predetermined value.

12. A laser machining apparatus according to claim 11, wherein the temperature of the object of temperature control is temperature of coolant of the laser oscillator.

13. A laser machining apparatus according to claim 11, wherein the temperature of the object of temperature control is temperature of a resonator of the laser oscillator.

* * * * *